United States Patent
Lin et al.

(10) Patent No.: US 7,627,339 B2
(45) Date of Patent: Dec. 1, 2009

(54) APPLICATION-ORIENTED AND INTELLIGENT METHOD FOR SWITCHING COMMUNICATION MODES OF A DUAL-MODE COMMUNICATION MODULE

(75) Inventors: Feng Lin, Taipei (TW); Shin-Ming Cheng, Taipei (TW); Shun-Ren Yang, Taipei (TW); Pei-Tang Huang, Taipei (TW)

(73) Assignee: Inventec Appliances Corp., Wugu Shiang, Taipei (TW)

( * ) Notice: Subject to any disclaimer, the term of this patent is extended or adjusted under 35 U.S.C. 154(b) by 469 days.

(21) Appl. No.: 11/695,062

(22) Filed: Apr. 2, 2007

(65) Prior Publication Data

US 2008/0242345 A1 Oct. 2, 2008

(51) Int. Cl.
*H04Q 7/20* (2006.01)

(52) U.S. Cl. ............... 455/552.1; 455/127.4; 455/177.1; 455/418

(58) Field of Classification Search ............... 455/552.1, 455/418, 277.2, 266, 200.1, 184.1, 181.1, 455/177.1, 127.4, 127.5, 135, 410, 432.1, 455/435.1, 436, 41.2; 370/328, 401
See application file for complete search history.

(56) References Cited

U.S. PATENT DOCUMENTS

| | | | |
|---|---|---|---|
| 7,321,755 B2 * | 1/2008 | Hulvey | 455/343.1 |
| 2007/0126714 A1 * | 6/2007 | Imamura | 345/173 |
| 2007/0222852 A1 * | 9/2007 | Jang | 348/14.01 |
| 2008/0227482 A1 * | 9/2008 | Lin et al. | 455/552.1 |
| 2008/0305792 A1 * | 12/2008 | Khetawat et al. | 455/435.1 |
| 2009/0077207 A1 * | 3/2009 | Karaoguz et al. | 709/220 |

OTHER PUBLICATIONS

Digital cellular telecommunications system(Phase 2+); Generic access to the A/Gb interface; Stage 2 (3GPP TS 43.318 version 6.7.0 Release 6), Technical Specification, Jun. 2006, p. 1-72.

* cited by examiner

*Primary Examiner*—Tan Trinh
(74) *Attorney, Agent, or Firm*—Winston Hsu

(57) ABSTRACT

An application-oriented and intelligent method for switching communication modes of a dual-mode communication module is provided. Whether the application program utilizes location-based service is first confirmed. When the application program utilizes location-based service, said communication module is switched to the first communication mode. Otherwise, evaluation, about which one from both the first communication mode and the second communication mode is more beneficial for a user, is performed on the communication module, according to both an available bandwidth and quality of service provided by a communication mode and to both a power and a credit of utilizing communication functions of the communication module. At last, a result of the evaluation is utilized for determining which communication mode from both the first communication mode and the second communication mode to be utilized by the communication module.

21 Claims, 1 Drawing Sheet

APPLICATION-ORIENTED AND INTELLIGENT METHOD FOR SWITCHING COMMUNICATION MODES OF A DUAL-MODE COMMUNICATION MODULE

BACKGROUND OF THE INVENTION

1. Field of the Invention

The present invention relates to an intelligent method for switching communication modes of a dual-mode communication module, and more particularly, to an application-oriented and intelligent method for switching communication modes of a dual-mode communication module.

2. Description of the Prior Art

Popular cell phones conventionally support a plurality of communication modes for utilizing the plurality of supported communication modes. With variant locations and various utilized communication networks while utilizing a conventional cell phone, switching between various communication networks and between cells of a communication network is strictly regulated for handling switches of communication networks or cells under various conditions, which are highly related to requirements of users and to whether a communication network is currently available.

In the spec. 3GPP TS 43.318 V6.7.0, which is published on June, 2006, switching between communication networks to a certain degree and related to both the GERAN/UTRAN mode (for Global System for Mobile communications (GSM) Enhanced Data rates for GSM Evolution (EDGE) Radio Access Network (GERAN)/Universal Mobile Telecommunications System (UMTS) Terrestrial Radio Access Network (UTRAN) mode and briefed as G/U mode) and the Generic Access Network mode (briefed as GAN mode) are described, where the switching between the UTRAN communication network and the GAN communication network is also included. In the spec., a cell phone is assumed to merely perform switching between the G/U mode and the GAN mode. After a cell phone boots up, four default user-preferred settings, which include GERAN/UTRAN-only (briefed as G/U-only), GERAN/UTRAN-preferred (briefed as G/U-preferred), GAN-only, and GAN-preferred, are provided.

The setting G/U-only indicates that after the cell phone boots up, the cell phone merely enters the G/U mode other than the GAN mode, and a No Service state of the GAN mode. The setting G/U-preferred indicates that after the cell phone boots up, the cell phone enters the G/U mode in principle, however, under certain conditions, said cell phone switches to utilize the GAN mode, where the certain conditions includes failing to access the G/U communication network with a cell, which utilizes the G/U mode inside said cell phone, i.e., the G/U communication network cannot be discovered by said cell phone, and failing to register said G/U communication network. Similarly, the setting GAN-only indicates that after the cell phone boots up, said cell phone merely enters the GAN mode other than the G/U mode, and a No Service state of the G/U mode. The setting GAN-preferred indicates that after the cell phone boots up, said phone enters the GAN mode in principle, however, under certain conditions, said cell phone switches to enter the G/U communication network, where the certain condition includes failing to access the GAN communication network with a cell, which utilizes the GAN mode inside said cell phone, i.e., the GAN communication network cannot be discovered, and failing to register the GAN communication network.

Switches between the G/U mode and the GAN mode include rove-in, rove-out, and handover between the G/U mode and GAN mode. The rove-in indicates switching from the G/U mode to the GAN mode when the cell phone does not transmit data currently. The rove-out indicates switching from the GAN mode to the G/U mode when the cell phone does not transmit data currently. The handover indicates switching from the G/U mode to the GAN mode or from the GAN mode to the G/U mode when the cell phone transmits data currently.

Under the supposition that merely switches between the UTRAN communication network and the GAN communication network are taken into consideration, and under the condition that a cell phone is switched to the UTRAN mode or to the GAN mode, though it is convenient for the cell phone to determine which communication mode to be entered with the abovementioned operations and conditions in the spec, a user of the cell phone may lose benefits in certain aspects because there are respective advantages and defects in utilizing one of the UTRAN communication network and the GAN communication network, and because the user may not have the patience for determining which communication mode to be entered at anytime, where the certain aspects are related to life cycle of the cell phone, which is not currently charged, and to the rating of utilizing one of the UTRAN communication network and the GAN communication network.

SUMMARY OF THE INVENTION

The claimed invention provides an application-oriented and intelligent method for switching communication modes of a dual-mode communication module, where the dual-mode communication module utilizes at least a first communication mode and a second communication mode. The method comprises (a) providing a first communication mode coefficient and a second communication mode coefficient, and setting initial values of both the first and second communication mode coefficients to be a same value; (b) providing a first impact constant and a second impact constant, where the first impact constant is larger than the second impact constant; (c) activating an application program, which is installed on the dual-mode communication module, and determining whether the application program utilizes location-based service (LBS) according to a first application program coefficient; (d) when the first application program coefficient indicates that the application program does not utilize the location-based service, performing steps comprises (d1) checking whether an available bandwidth of the first communication mode is larger than a required bandwidth of the application program; (d2) checking whether an available bandwidth of the second communication mode is larger than the required bandwidth of the application program; (d3) checking the quality of service (QoS) of the application program; (d4) checking whether a remaining power of the dual-mode communication module is higher than a critical power of said dual-mode communication module; (d5) checking whether a credit of a user for utilizing the dual-mode communication module is larger than a budget for utilizing said dual-mode communication module; and (d6) updating both of the first communication mode coefficient and the second communication mode coefficient with both of the first impact constant and the second impact constant; and (e) comparing the first communication mode coefficient with the second communication mode coefficient for determining which one of both the first communication mode or the second communication mode is to be accessed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
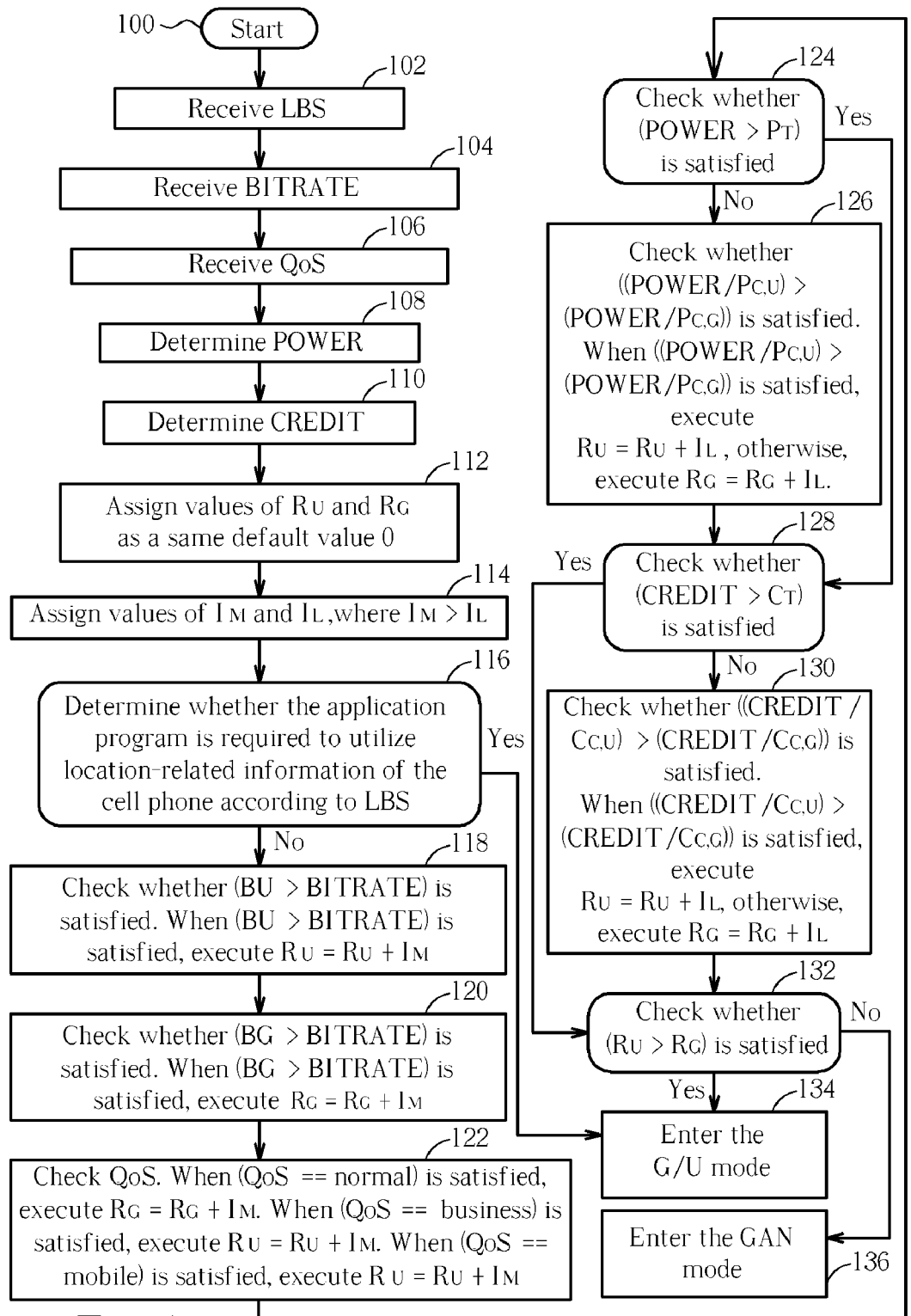
FIG. 1 is a flowchart of the application-oriented and intelligent method for switching communication modes of the dual-mode communication module in the present invention.

Therefore, the present invention provides an application-oriented and intelligent method for switching communication modes of a dual-mode communication module, and for preventing a user from losing benefits in certain aspects because the user cannot dynamically determine which communication mode to be entered at anytime. The communication modes of the dual-mode communication module particularly include the GAN mode under the GAN communication network and the UTRAN mode under the UTRAN communication network.

Please refer to FIG. 1, which is a flowchart of the application-oriented and intelligent method for switching communication modes of the dual-mode communication module in the present invention. Note that the dual-mode communication module is supposed to be disposed inside a cell phone, which utilizes an application program to support the illustrated method in FIG. 1 according to a preferred embodiment of the present invention. In FIG. 1, steps in the flowchart are listed as follows:

Step 100: Start.

Step 102: Receive a location-based service coefficient LBS.

Step 104: Receive a required bandwidth BITRATE of an application program.

Step 106: Receive the quality of service QoS of the application program.

Step 108: Determine a remaining power POWER of the cell phone.

Step 110: Determine a credit CREDIT of the user for utilizing communication functions of the cell phone.

Step 112: Assign values of both a UTRAN mode coefficient $R_U$ and a GAN mode coefficient $R_G$ as a same default value, which is 0.

Step 114: Assign values of both a first impact constant $I_M$ and a second impact constant $I_L$, where the value of the first impact constant $I_M$ is larger than the second impact constant $I_L$.

Step 116: Determine whether the application program is required to utilize location-related information of the cell phone according to the value of the location-based service coefficient LBS. When the location-based service coefficient LBS indicates that the application program is required to utilize the location-related information of the cell phone, go to Step 134, otherwise, go to Step 118.

Step 118: Check whether an available bandwidth $B_U$ of the UTRAN mode is larger than the required bandwidth BITRATE of the application program. When the available bandwidth $B_U$ of the UTRAN mode is larger than the required bandwidth of the application program, calculate a sum of the UTRAN mode coefficient $R_U$ and the first impact constant $I_M$, and replace the value of the UTRAN mode coefficient $R_U$ with the value of the calculated sum.

Step 120: Check whether an available bandwidth $B_G$ of the GAN mode is larger than the required bandwidth BITRATE of the application program. When the available bandwidth $B_G$ of the GAN mode is larger than the required bandwidth BITRATE of the application program, calculate a sum of the GAN mode coefficient $R_G$ and the first impact coefficient $I_M$, and replace the value of the GAN mode coefficient $R_G$ with the calculated sum.

Step 122: Check the quality of service QoS of the application program. When the quality of service QoS of the application program indicates that the cell phone is currently immobile, calculate a sum of the GAN mode coefficient $R_G$ and the first impact constant $I_M$, and replace the value of the GAN mode coefficient $R_G$ with the calculated sum. When the quality of service QoS indicates that the cell phone is currently used under commercial purposes, calculate a sum of the UTRAN mode coefficient $R_U$ and the first impact constant $I_M$, and replace the value of the UTRAN mode coefficient $R_U$ with the calculated sum. When the quality of service QoS of the application program indicates that the cell phone is currently mobile, calculate a sum of the UTRAN mode $R_U$ coefficient and the first impact constant $I_M$, and replace the value of the UTRAN mode coefficient $R_U$ with the calculated sum.

Step 124: Compare the remaining power POWER of the dual-mode communication module with a critical power $P_T$ of the cell phone. When the remaining power POWER of the dual-mode communication module is greater than the critical power $P_T$, go to Step 128, otherwise, go to Step 126.

Step 126: Compare a first power coefficient of the cell phone under the UTRAN mode with a second power coefficient of said cell phone under the GAN mode. When the first power coefficient is larger than the second power coefficient, calculate a sum of the UTRAN mode coefficient $R_U$ and the second impact constant $I_L$, and replace the value of the UTRAN mode coefficient $R_U$ with the calculated sum. Otherwise, calculate a sum of the GAN mode coefficient $R_G$ and the second impact constant $I_L$, and replace the value of the GAN mode coefficient $R_G$ with the calculated sum. Note that the first power coefficient is generated by dividing the remaining power POWER by a power consumption rate of the cell phone under the UTRAN mode, and the second power coefficient is generated by dividing the remaining power POWER by a power consumption rate of the cell phone under the GAN mode.

Step 128: Compare the credit CREDIT of the user for utilizing communication functions of the cell phone with a default budget $C_T$ of said cell phone. When the credit CREDIT is larger than the budget $C_T$, go to Step 132, otherwise, go to Step 130.

Step 130: Compare a first budget coefficient with a second budget coefficient. When the first budget coefficient is larger than the second budget coefficient, calculate a sum of the UTRAN mode coefficient $R_U$ and the second impact constant $I_L$, and replace the value of the UTRAN mode coefficient $R_U$ with the calculated sum. Otherwise, calculate a sum of the GAN mode coefficient $R_G$ and the second impact constant $I_L$, and replace the value of the GAN mode coefficient $R_G$ with the calculated sum.

Step 132: Compare the UTRAN mode coefficient $R_U$ with the GAN mode coefficient $R_G$ for determining which one of the UTRAN mode and the GAN mode is to be entered by the cell phone. When the UTRAN mode coefficient $R_U$ is larger than the GAN mode coefficient $R_G$, go to Step 134, otherwise, go to Step 136.

Step 134: Switch the cell phone to enter the G/U mode.

Step 136: Switch the cell phone to enter the GAN mode.

The primary aim of the method illustrated in FIG. 1 is to rank which one of the UTRAN mode and the GAN mode is more beneficial than the other to be entered with both the UTRAN mode coefficient $R_U$ and the GAN mode coefficient $R_G$. It indicates the fact that the cell phone is automatically switched to enter a communication mode having a larger communication mode coefficient according to a result of the final comparison between the UTRAN mode coefficient $R_U$ and the GAN mode coefficient $R_G$. In the method illustrated in FIG. 1, values of both the UTRAN mode coefficient $R_U$ and the GAN mode coefficient $R_G$ are determined according to factors including the location-related information, the available bandwidth, the quality of service, the power status, and the credit of utilizing communication functions of said cell phone. However, impacts of the above-mentioned factors for determining which communication mode to be entered vary significantly, and therefore, the first impact constant $I_M$ and the second impact constant $I_L$ are provided in the method illustrated in FIG. 1 for evaluating impacts of said abovementioned factors. Note that the first impact constant $I_M$ is larger than the second impact constant $I_L$ so that a factor evaluated with the first impact constant $I_M$ has a greater effect on determining which communication mode to be entered, i.e., the factor evaluated with the first impact constant $I_M$ is a more dominant factor. Similarly, a factor evaluated with the second impact constant $I_L$ has a smaller effect on determining which communication mode to be entered, i.e., the factor evaluated with the second impact constant $I_L$ is more trivial.

In Step 116, merely the UTRAN communication network is supposed to be capable of providing the location-based service, whereas the GAN communication network is supposed to be incapable of providing the location-based service. Therefore, when the application program is able to reach the location-based service, the cell phone is immediately switched to enter the UTRAN mode. In a preferred embodiment of the present invention, the location-based service coefficient LBS is implemented with a Boolean variable for indicating whether the application program is able to reach the location-based service. When the value of the location-based service coefficient LBS is true, it indicates the fact that the application program is able to reach the location-based service, and moreover, it merely indicates a preferred embodiment of the present invention. In other embodiments of the present invention, means for informing the cell phone whether the application program is able to reach the location-based service are utilized, and should not be limitations to the present invention. For example, in an embodiment of the present invention, the condition that the application program is able to reach the location-based service is set to be indicated by the location-based service coefficient LBS having the value false. The reason why the GAN communication network cannot provide the location-based service lies on the fact that the GAN communication network cannot know access points (AP), at which all online mobile stations (MS) are located, very well although the GAN communication network is able to communicate with the serving mobile location center (SBLC) of the universal mobile telecommunication system (UMTS), and the fact that location-related information of the cell phone, which utilizes the GAN communication network relating to the wireless local area network (WLAN), is related to locations of access points. The lain-on facts indicate the defect that the GAN communication network is unable to provide precise location-based service for the core network (CN) and the mobile stations so that the GAN communication network fails to satisfy requirements of the location-based service.

In Step 118 and Step 120, since the factor of the available bandwidth has a greater effect on utilizing the cell phone, not only does the communication network provide an available bandwidth larger than the required bandwidth of the application program is regarded to be beneficial for the user, but a value of a communication mode coefficient corresponding to the beneficial communication network is increased by the value of the first impact constant $I_M$, which is larger than the second impact constant $I_L$. In Step 118, when the available bandwidth $B_U$ of the UTRAN communication network is larger than the required bandwidth BITRATE of the application program, the value of the UTRAN mode coefficient $R_U$ is increased once by the value of the first impact constant $I_M$, and otherwise, the value of the UTRAN mode coefficient $R_U$ is kept. Similarly, in Step 120, when the available bandwidth $B_G$ of the GAN communication network is larger than the required bandwidth BITRATE of the application program, the value of the GAN mode coefficient $R_G$ is increased once by the value of the first impact constant $I_M$, and otherwise, the value of the GAN mode coefficient $R_G$ is kept.

In Step 122, since the mobile management (MM) is critical in the quality of service, the factor of the quality of service, or particularly of the mobile management, has a greater effect on utilizing the cell phone and is similarly evaluated with the first impact constant $I_M$. Under the UTRAN communication network, the quality of service is strictly regulated, though the wireless local area network, which relates to the GAN communication network, cannot ensure the quality of service up to a sufficient degree. Moreover, when the cell phone is currently mobile, an available domain of the wireless local area network is smaller than an available domain of the UTRAN communication network, and the wireless local area network does not support the mobile management as much as the UTRAN communication network. Therefore, when the cell phone is currently mobile, the UTRAN communication network is more beneficial to utilize the cell phone than the GAN communication network. In a preferred embodiment of the present invention, three types of quality of service are classified for requirements of the application program. A first type of quality of service indicates that the cell phone is currently immobile so that the GAN communication network is more beneficial to utilize the cell phone, where a value of the quality of service coefficient QoS is concurrently assigned to be "normal" for indicating the first type of quality of service. A second type of quality of service indicates that the cell phone is currently used under commercial purposes so that the UTRAN communication network is more beneficial to utilize the cell phone, where the value of the quality of service coefficient QoS is concurrently assigned to be "business" for indicating the second type of quality of service. The third type of quality of service indicates that the cell phone is currently mobile so that the UTRAN communication network is more beneficial to utilize the cell phone because of the abovementioned reason relating to the mobile management, where the reason implies that utilizing GAN communication network under the third type of quality of service may result in failed connections seriously, and where the value of the quality of service coefficient QoS is concurrently assigned to be "mobile" for indicating the third type of quality of service. As a summary in the preferred embodiment of the present invention, when the value of the quality of service coefficient QoS is "normal", the value of the GAN mode coefficient $R_G$ is increased by the value of the first impact constant $I_M$. When the value of the quality of service coefficient QoS is "business", the value of the UTRAN mode coefficient $R_U$ is increased by the value of the first impact constant $I_M$. When the value of the quality of service coefficient QoS is "mobile", the value of the UTRAN mode coefficient $R_U$ is increased by the value of the first impact constant $I_M$.

In Step 124 and Step 126, the factor of power status of the cell phone has a smaller effect on utilizing the cell phone, therefore, said factor of power status is evaluated with the second impact constant $I_L$. In Step 124, when the remaining power POWER of the cell phone is larger than a default critical power $P_T$ of the application program, steps of evaluating the factor of the power status of the cell phone in FIG. 1 are immediately skipped, and otherwise, proceed to Step 126. In Step 126, a first power coefficient of the cell phone under the UTRAN mode and a second power coefficient of the cell phone under the GAN mode are first calculated respectively. Assume a power consumption rate of the cell phone under the UTRAN mode is $P_{C,U}$, and a power consumption rate of the cell phone under the GAN mode is $P_{C,G}$, then in Step 126, the first power coefficient is (POWER/$P_{C,U}$), and the second power coefficient is (POWER/$P_{C,G}$). When the value of the first power coefficient (POWER/$P_{C,U}$) is larger than the value of the second power coefficient (POWER/$P_{C,G}$), the value of the UTRAN mode coefficient $R_U$ is increased once by the value of the second impact constant $I_L$, and otherwise, the value of the GAN mode coefficient $R_G$ is increased once by the value of the second impact constant $I_L$. Besides, under conventional conditions, since the power consumption rate $P_{C,U}$ of the cell phone under the UTRAN mode is smaller than the power consumption rate $P_{C,G}$ of said cell phone under the GAN mode, the first power coefficient (POWER/$P_{C,U}$) is easily larger than the second power coefficient (POWER/$P_{C,G}$).

In Step 128 and Step 130, the factor of the credit of the user for utilizing the cell phone has a smaller effect on utilizing said cell phone, therefore, the second impact constant $I_L$ is also utilized for evaluating said factor. In Step 128, similar with Step 124, when the credit CREDIT of utilizing communication functions of the cell phone is larger than a default budget of the application program, steps of evaluating the factor of the credit for utilizing the communication functions of said cell phone are immediately skipped, otherwise, go to Step 130. In Step 130, a first budget coefficient of the cell phone under the UTRAN mode and a second budget coefficient of said cell phone under the GAN mode are first calculated respectively. Assume a credit-spending rate of the cell phone under the UTRAN mode is $C_{C,U}$, and a credit spending rate of said cell phone under the GAN mode is $C_{C,G}$, then the first budget coefficient is (CREDIT/$C_{C,U}$), and the second budget coefficient is (CREDIT/$C_{C,G}$). When the value of the first budget coefficient (CREDIT/$C_{C,U}$) is larger than the value of the second budget coefficient (CREDIT/$C_{C,G}$), the value of the UTRAN mode coefficient $R_U$ is increased once by the value of the second impact constant $I_L$, and otherwise, the value of the GAN mode coefficient $R_G$ is increased once by the value of the second impact coefficient $I_L$. Under conventional conditions, since the UTRAN communication network utilizes authorized bandwidths whereas the GAN communication network utilizes unauthorized bandwidths, the credit spending rate $C_{C,U}$ of the cell phone under the UTRAN mode is easily higher than the credit spending rate $C_{C,G}$ of said cell phone under the GAN mode. Therefore, the value of the first budget coefficient (CREDIT/$C_{C,U}$) is easily smaller than the value of the second budget coefficient (CREDIT/$C_{C,G}$).

In Step 132, after the abovementioned evaluations (or ranking) on both the UTRAN mode coefficient $R_U$ and the GAN mode coefficient $R_G$ with both the first impact constant $I_M$ and the second impact constant $I_L$ from Step 118 to Step 130, final values of both said UTRAN mode coefficient $R_U$ and said GAN mode coefficient $R_G$ are compared. In the comparison, when the value of the UTRAN mode coefficient $R_U$ is larger than the value of the GAN mode coefficient $R_G$, it indicates the fact that it is currently beneficial for the user to utilize the UTRAN communication network, and the cell phone is then switched to enter the UTRAN mode, and otherwise, said cell phone is switched to enter the GAN mode.

Note that during steps from Step 118 to Step 130, the order of evaluating the factors including the available bandwidth, the quality of service, the remaining power, and the credit of the cell phone may be permuted. In other words, when Step 118 and Step 120 are assumed to form a first set, Step 122 is regarded as a second set, Step 124 and Step 126 are assumed to form a third set, and Step 128 and Step 130 are assumed to form a fourth set, the order of executing all the sets may be permuted without affecting the execution of the illustrated method in FIG. 1 of the present invention. Moreover, subsets of the abovementioned sets, which are related to the evaluated factors, for performing the illustrated method in FIG. 1 should also be related to embodiments of the present invention.

The method of the present invention may also be utilized on communication devices besides the cell phone. Therefore, utilizing the method of the present invention on communication devices besides the cell phone should be embodiments of the present invention.

The present invention provides an application-oriented and intelligent method for switching communication modes, which include the GAN mode and the UTRAN mode, of a communication module for taking benefits of a user into consideration while determining which communication mode for the communication module to be entered. The method provided in the present invention is also performed dynamically for reaching the aim of switching the communication module to a communication mode, which is most beneficial for the user, at anytime.

Those skilled in the art will readily observe that numerous modifications and alterations of the device and method may be made while retaining the teachings of the invention.

What is claimed is:

1. An application-oriented and intelligent method for switching communication modes of a dual-mode communication module, wherein the dual-mode communication module utilizes at least a first communication mode and a second communication mode, the method comprising:

providing a first communication mode coefficient and a second communication mode coefficient, and setting initial values of both the first and second communication mode coefficients to be a same value;

providing a first impact constant and a second impact constant, wherein the first impact constant is larger than the second impact constant;

activating an application program, which is installed on the dual-mode communication module, and determining whether the application program utilizes location-based service (LBS) according to a first application program coefficient;

when the first application program coefficient indicates that the application program does not utilize the location-based service, performing steps comprising:

checking whether an available bandwidth of the first communication mode is larger than a required bandwidth of the application program;

checking whether an available bandwidth of the second communication mode is larger than the required bandwidth of the application program;

checking the quality of service (QoS) of the application program;

checking whether a remaining power of the dual-mode communication module is higher than a critical power of said dual-mode communication module;

checking whether a credit of a user for utilizing the dual-mode communication module is larger than a budget for utilizing said dual-mode communication module; and updating both of the first communication mode coefficient and the second communication mode coefficient with both of the first impact constant and the second impact constant; and comparing the first communication mode coefficient with the second communication mode coefficient for determining which one of both the first communication mode and the second communication mode is to be accessed.

2. The method of claim 1 further comprising:
receiving the first application program coefficient;
informing the required bandwidth of the application program;
informing the quality of service of the application program;
determining the remaining power of the dual-mode communication module; and
determining the credit of the user for utilizing the dual-mode communication module.

3. The method of claim 1 further comprising:
activating the first communication mode when the first application program coefficient indicates that the application program utilizes the location-based service.

4. The method of claim 1 further comprising:
calculating a sum of the first communication mode coefficient and the first impact constant, and updating the value of the first communication mode coefficient with the calculated sum when the available bandwidth of the first communication mode is larger than the required bandwidth of the application program.

5. The method of claim 1 further comprising:
calculating a sum of the second communication mode coefficient and the first impact constant, and updating a value of the second communication mode coefficient with the calculated sum when the available bandwidth of the second communication mode is larger than the required bandwidth of the application program.

6. The method of claim 1 further comprising:
calculating a sum of the second communication mode coefficient and the first impact constant, and updating a value of the second communication mode coefficient with the calculated sum when the quality of service of the application program indicates that the dual-mode communication module is currently immobile.

7. The method of claim 1 further comprising:
calculating a sum of the first communication mode coefficient and the first impact constant, and updating a value of the first communication mode coefficient with the calculated sum when the quality of service of the application program indicates that the dual-mode communication module is utilized under commercial purposes.

8. The method of claim 1 further comprising:
calculating a sum of the first communication mode coefficient and the first impact constant, and updating a value of the first communication mode coefficient with the calculated sum when the quality of service of the application program indicates that the dual-mode communication module is currently mobile.

9. The method of claim 1 further comprising:
comparing a first power coefficient with a second power coefficient when the remaining power of the dual-mode communication module is smaller than or equal to the critical power, wherein the first power coefficient equals said remaining power of said dual-mode communication module divided by a first unit power consumption of utilizing the first communication mode, and the second power coefficient equals said remaining power of said dual-mode communication module divided by a second unit power consumption of utilizing the second communication mode.

10. The method of claim 9 further comprising:
calculating a first sum of the first communication mode coefficient and the second impact constant, and updating a value of the first communication mode coefficient with the calculated first sum when the first power coefficient is larger than the second power coefficient.

11. The method of claim 9 further comprising:
calculating a second sum of the second communication mode coefficient and the second impact constant, and updating a value of the second communication mode coefficient with the calculated second sum when the first power coefficient is smaller than or equal to the second power coefficient.

12. The method of claim 1 further comprising:
checking whether the credit of the user for utilizing the dual-mode communication module is larger than the budget of the dual-mode communication module when the remaining power of the dual-mode communication module is larger than the critical power.

13. The method of claim 1 further comprising:
comparing a first budget coefficient with a second budget coefficient when the credit of the user for utilizing the dual-mode communication module is smaller than or equal to the budget of said dual-mode communication module, wherein the first budget coefficient equals said credit for said user for utilizing said dual-mode communication module divided by a unit spending budget of said dual-mode communication module for utilizing the first communication mode, and the second budget coefficient equals said credit of said user for utilizing said dual-mode communication module divided by a unit spending budget of said dual-mode communication module for utilizing the second communication mode.

14. The method of claim 13 further comprising:
calculating a first sum of the first communication mode coefficient and the second impact constant, and updating a value of the first communication mode coefficient with the calculated first sum when the first budget coefficient is larger than the second budget coefficient.

15. The method of claim 13 further comprising:
calculating a second sum of the second communication mode coefficient and the second impact constant, and updating the second communication mode coefficient with the calculated second sum when the first budget coefficient is smaller than or equal to the second budget coefficient.

16. The method of claim 1 further comprising:
comparing the first communication mode coefficient with the second communication mode coefficient for determining which one of both the first communication mode and the second communication mode is to be activated when the credit of the user for utilizing the dual-mode communication module is larger than the budget of said dual-mode communication module.

17. The method of claim 1 further comprising:
activating the first communication mode when the first communication mode coefficient is larger than the second communication mode coefficient.

18. The method of claim 1 further comprising:

activating the second communication mode when the first communication mode coefficient is smaller than or equal to the second communication mode coefficient.

19. The method of claim 1 wherein the first communication mode is Universal Mobile Telecommunication System (UMTS) Terrestrial Radio Access Network mode, which is also denoted as UTRAN mode.

20. The method of claim 1 wherein the second communication mode is Generic Access Network (GAN) mode.

21. The method of claim 1 wherein setting initial values of both the first and second communication mode coefficients to be the same value comprises:

setting the initial values of both the first and second communication mode coefficients to be 0.

* * * * *